(12) United States Patent
Mazza et al.

(10) Patent No.: US 12,015,366 B2
(45) Date of Patent: Jun. 18, 2024

(54) PARALLEL SYNCHRONOUS MACHINES WITH SINGLE MOTOR DRIVE

(71) Applicant: ABB Schweiz AG, Baden (CH)

(72) Inventors: Lorenzo Mazza, Fort Smith, AR (US); Zubair Ali, New Berlin, WI (US); Toni Tuovinen, New Berlin, WI (US); Brian Pisani, New Berlin, WI (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 17/658,621

(22) Filed: Apr. 8, 2022

(65) Prior Publication Data

US 2023/0327583 A1 Oct. 12, 2023

(51) Int. Cl.
*H02P 5/50* (2016.01)
*H02P 21/22* (2016.01)
*H02P 21/34* (2016.01)

(52) U.S. Cl.
CPC .............. *H02P 5/50* (2013.01); *H02P 21/22* (2016.02); *H02P 21/34* (2016.02); *H02P 2207/05* (2013.01)

(58) Field of Classification Search
CPC .. H02P 5/50; H02P 21/22; H02P 21/34; H02P 2207/05; H02P 27/047; H02P 27/06; H02P 5/46; H02P 25/064; H02P 27/45; H02P 1/56; H02P 5/74
See application file for complete search history.

(56) References Cited

U.S. PATENT DOCUMENTS

| 4,447,788 A | 5/1984 | Mundt et al. |
| 2007/0273310 A1 | 11/2007 | Foch et al. |
| 2008/0150455 A1* | 6/2008 | Shinmura .............. H02K 11/33 310/198 |

(Continued)

FOREIGN PATENT DOCUMENTS

| KR | 2011019703 A | * | 2/2011 | .............. H02P 27/08 |
| WO | WO-2019142302 A1 | * | 7/2019 | .............. A01N 43/40 |

OTHER PUBLICATIONS

T Song, A Singular Perturbation Approach to Sensorless Control of a Permanent Magnet Synchronous Motor, 1997, IEEE, MC37.1-MC3-7.3 (Year: 1997).*

(Continued)

*Primary Examiner* — Bickey Dhakal
(74) *Attorney, Agent, or Firm* — Greenberg Traurig, LLP (57) ABSTRACT

A system for controlling plurality of synchronous motors connected in parallel including a motor drive, current sensor, and plurality of synchronous motors connected in parallel to the motor drive. The synchronous motors connected to the motor drive can include the same size and power rating to allow synchronous operation and have similar load capacity. Further, the system can operate with substantially similar loads on each of the plurality of synchronous motors. The motor drive can be a variable speed drive using vector control and a closed loop current controller to control the motors. The motor drive can be a variable frequency drive using scalar control and open loop controller to control the motors. The motor drive controls the plurality of synchronous motors by maintaining net active power and net active power, and by rejecting power perturbations, at the common node.

20 Claims, 8 Drawing Sheets

(56) References Cited

U.S. PATENT DOCUMENTS

| | | | |
|---|---|---|---|
| 2011/0133678 A1* | 6/2011 | Tomigashi | H02P 27/08 |
| | | | 318/400.04 |
| 2015/0236625 A1* | 8/2015 | Cho | H02K 15/00 |
| | | | 318/400.15 |
| 2017/0257043 A1* | 9/2017 | Lorilla | H02P 6/10 |
| 2019/0165701 A1* | 5/2019 | Chretien | H02P 21/22 |
| 2021/0067066 A1* | 3/2021 | Takahashi | H02P 5/50 |
| 2021/0135606 A1 | 5/2021 | Kwon et al. | |

OTHER PUBLICATIONS

Fadel, Maurice, et al.; "Direct Torque Control—A Solution for Mono Inverter-Dual Parallel PMSM System"; 2013 21st Mediterranean Conference on Control & Automation (MED) Platanias-Chania; Crete, Greece; Jun. 25-28, 2013; pp. 1477-1483.

Nagano, Tsuyoshi, et al.; "Parallel Connected Multiple Motor Drive System Using Small Auxilliary Inverter for Permanent Magnet Synchronous Motors"; The Institute of Electrical Engineers of Japan: IEEJ Journal of Industry Applications; vol. 4, No. 1, pp. 44-48; 2015.

Roldan-Perez, et al.; Virtual Synchronous Machine Control of VSC HVDC for Power System Oscillation Damping; 44th Annual Conference of the IEEE Industry Electronics Society (IECON2018); 6 pages.

Smed, et al.; "Utilising HVDC to Damp Power Oscillations"; Dept. of Electric Power Systems, Royal Institute of Technology; Stockholm, Sweden; IEEE Transactions on Power Delivery, vol. 8, No. 2, Apr. 1993; pp. 620-627.

Extended Search report issued by the European Patent Office from corresponding European Patent Application No. 23165196.9, dated Sep. 8, 2023.

* cited by examiner

PARALLEL SYNCHRONOUS MACHINES WITH SINGLE MOTOR DRIVE

FIELD

The present disclosure relates to electrical machines, and more particularly, to parallel operation of synchronous machines using a single motor drive.

BACKGROUND

Various applications implement multiple electrical machines connected in a parallel configuration. However, these configurations typically include a single motor drive connected to and controlling each synchronous motor, or a single motor drive controlling multiple asynchronous motors. For controlling multiple asynchronous motors connected in parallel, the motor drive operates in open loop control without individual current sensor signals from the asynchronous motors. For controlling multiple synchronous motors connected in parallel, each motor drive operates in closed loop control vector control to receive signal feedback from each motor to indicate the phase current, speed, position, or direction of each motor to control the motor drive output. However, lack of signal feedback relayed from the motors can result in a voltage mismatch and cause a motor connected to the motor drive to draw excessive current. Thereby resulting in potential damage to the system. Thus, improved systems for operating multiple synchronous motors in parallel are desirable

SUMMARY

To address or at least partially address the above and other potential problems, embodiments of the present disclosure provide a system and method for operating multiple synchronous motors connected in parallel using a single motor drive.

In some embodiments, a system includes: a single motor drive including, an input including an input signal based on a user input, an output including an output signal determined by the single motor drive, a current sensor, wherein the current sensor detects the output signal; and a plurality of synchronous motors, wherein the plurality of synchronous motors includes being connected in parallel to the single motor drive, the plurality of synchronous motors having a similar load connected to each of the plurality of synchronous motors, wherein the single motor drive receives the measured output signal from the current sensor; wherein the single motor drive controls the plurality of synchronous motors based on the input signal and the output signal.

In some embodiments, the input signal includes a reference speed, a reference torque, a reference flux, and a combination thereof.

In some embodiments, the output signal includes a three phase AC line, and wherein the current sensor includes being disposed on the three phase AC line to detect the current.

In some embodiments, the single motor drive further includes: an inverter, wherein the inverter includes a DC bus, and wherein the inverter converts a DC voltage on the DC bus to a three phase AC output; wherein the current sensor further includes being disposed on the DC bus to detect the DC link current.

In some embodiments, the current sensor detects a power perturbation from the plurality of synchronous motors, and wherein the single motor drive rejects the power perturbation in the plurality of synchronous motors by controlling the output current based on the input signal.

In some embodiments, the power perturbation includes an aperiodic angular separation due to lack of synchronizing torque, a rotor angle instability due to insufficient damping torque, and combinations thereof.

In some embodiments, the single motor drive includes a variable speed drive having a closed loop current controller, and, wherein the variable speed drive controls the plurality of synchronous motors with vector control.

In some embodiments, the motor drive includes a variable frequency drive, wherein the variable frequency drive controls the plurality of synchronous motors with scalar Volts per Hertz control with stabilization loops.

In some embodiments, the plurality of synchronous motors includes from two to sixteen synchronous motors.

In some embodiments, the plurality of synchronous motors includes permanent magnet assisted synchronous motors.

In some embodiments, the plurality of synchronous motors includes pure synchronous reluctance motors.

In some embodiments, the plurality of synchronous motors includes interior permanent magnet synchronous motors.

In some embodiments, a method of operating a system, the system including a single motor drive, a plurality of synchronous motors connected in parallel to the single motor drive, and a current sensor to detect an output signal of the single motor drive, the method including: receiving, by the single motor drive, an input signal based on a user input, determining, by the single motor drive, the output signal based on the input signal; receiving, by the single motor drive, a feedback of the output signal from the current sensor; and controlling, by the single motor drive, the operation of the plurality of synchronous motors based on the input signal and the output signal.

In some embodiments, controlling, by the single motor drive, the plurality of synchronous motors by the output signal further includes: maintaining, by the single motor drive, a net active power and a net reactive power at the common node in equilibrium by controlling the output current based on the input signal; determining, by the current sensor, a power perturbation by the plurality of synchronous motors; and rejecting, by the single motor drive, a power perturbation in the plurality of synchronous motors by controlling the output current based on the input signal.

In some embodiments, the power perturbation includes an aperiodic angular separation due to lack of synchronizing torque, a rotor angle instability due to insufficient damping torque, and a combination thereof.

In some embodiments, the method further includes starting, by the single motor drive, the plurality of synchronous motors in synchronous operation; wherein synchronous operation includes each of the plurality of synchronous motors being in alignment and each of the plurality of synchronous motors being connected to a similar load.

In some embodiments, the single motor drive includes a variable frequency drive, and wherein controlling, by the single motor drive, the operation of the plurality of synchronous motors based on the input signal and the output signal further includes: controlling, by the variable frequency driver, the plurality of synchronous motors with scalar Volts per Hertz control with stabilization loops.

In some embodiments, the single motor drive includes a variable speed drive including a high dynamic closed loop current controller, and wherein controlling, by the single motor drive, the operation of the plurality of synchronous motors based on the input signal and the output signal further includes: controlling, by the variable speed driver, the plurality of synchronous motors with vector control.

In some embodiments, an apparatus for controlling multiple synchronous motors, includes: a single motor drive including: an input, wherein the input includes an input signal based on a user input, an output, wherein the output includes an output signal, an inverter, wherein the inverter converts a DC voltage to a three phase AC output; a current sensor, wherein the current sensor detects the output signal and provides a feedback to the single motor drive; and a plurality of synchronous motors, wherein the plurality of synchronous motors includes being connected to the single motor drive in a parallel configuration; wherein the single motor drive controls the operation of the plurality of synchronous motors by controlling the output signal based on the input signal and the measured output current.

In some embodiments, the current sensor detects a power perturbation from the plurality of synchronous motors, and wherein the power perturbation includes an aperiodic angular separation due to lack of synchronizing torque, a rotor angle instability due to insufficient damping torque, and a combination thereof.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Many applications utilize multiple asynchronous motors (i.e., induction motors) connected in parallel to a single motor drive. This is common in applications having similar load requirements where the multiple motors operate at the same speed and at similar load requirements, such as fans, pumps, and other similar devices. Typically, systems which call for constant speed and load requirements utilize asynchronous motors connected in parallel to a variable speed drive (VSD) using scalar Voltz per Hertz control due to simplicity of design and simplicity of the control logic. Moreover, no additional current and position sensors may be needed with this configuration.

Further, although permanent magnet (PM) synchronous motors are generally more efficient than induction motors, PM synchronous motor drives require rotor position information for operation and using PM synchronous motors in a multi-motor, parallel configuration has previously included rotor position sensors and/or current sensors for each motor. Without correct rotor position and/or phase current feedback information, the drive gate signals to the inverter switches may not properly commutate and may lead to a fault condition.

The present embodiments provide for operating multiple synchronous motors in a parallel configuration using a single motor drive. Hereinafter, the system and the method for operating the system will be illustrated based on the accompanying figures and descriptions.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. The phrases "in one embodiment," "in an embodiment," and "in some embodiments" as used herein do not necessarily refer to the same embodiment(s), though it may. Furthermore, the phrases "in another embodiment" and "in some other embodiments" as used herein do not necessarily refer to a different embodiment, although it may. All embodiments of the disclosure are intended to be combinable without departing from the scope or spirit of the disclosure.

As used herein "synchronous operation" can be defined as multiple electrical machines operating at similar inertia, speed, direction of rotation, similar alignment, other operational characteristics, and a combination thereof.

As used herein "motor drive" can be defined as any of a plurality of motor drives capable of controlling the operation of electrical machines through voltage, current, frequency, speed, torque, other signals, and a combination thereof. The motor drive can include, among other types of motor drives, variable speed drives, variable frequency drives, other motor drives including any component(s) capable of receiving reference input signals and/or measured signals provided to the motor drive, and the motor drive controlling the operation of an electrical machine connected to the motor drive by providing a voltage, current, frequency, other signals, and combinations thereof.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "between" does not necessarily require being disposed directly next to other elements.

Generally, this term means a configuration where something is sandwiched by two or more other things. At the same time, the term "between" can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or
- any combination(s) thereof.

Figure 1:
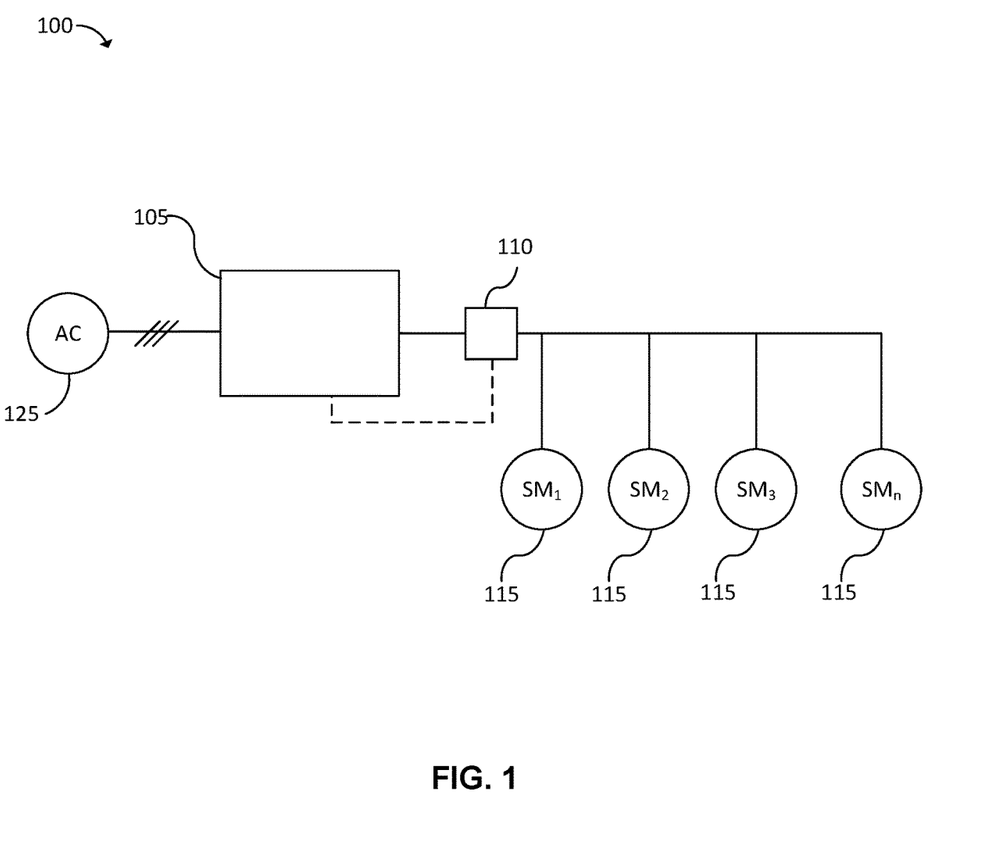
FIG. 1 is a schematic view of a system including a single motor drive connected to plurality of synchronous motors in parallel, according to some embodiments.

FIG. 1 is a schematic view of a system 100 including a single motor drive 105 connected to multiple synchronous motors 115 in parallel, according to some embodiments. A system 100 can include a single motor drive 105, a current sensor 110, and a plurality of synchronous motors 115. In some embodiments, the single motor drive 105 can include an input signal at an input. In some embodiments, the input signal can include a user input. In some embodiments, the input signal can be based on, at least in part, on a user input. In some embodiments, the user input can include an input to control the loads, the operation of the plurality of synchronous motors 115, other factors, and combinations thereof. In some embodiments, the single motor drive 105 can include an output signal at an output. In some embodiments, the output signal comprises a feedback signal from the current sensor. In some embodiments, the single motor drive 105 can determine the output signal based, in part, on the input signal. In some embodiments, the output signal can include a current and voltage to control the plurality of synchronous motors 115. In some embodiments, the single motor drive 105 can include any of a plurality of motor drives capable of controlling synchronous motors. In some embodiments, the single motor drive 105 can include a plurality of motor drives 105 connected in parallel and can include a common output to the plurality of synchronous motors 115.

In some embodiments, the single motor drive 105 can include a variable speed drive (VSD). In some embodiments, the VSD can include dynamic closed loop current control. In some embodiments, the VSD can control each of the plurality of synchronous motors using vector control. In some embodiments, the single motor drive 105 can control the plurality of synchronous motors 115 without receiving positional sensor information to provide position signals for each of the plurality of synchronous motors 115. Positional sensors can include encoders or other similar component capable of detecting rotor position, shaft position, other similar motor characteristics, and combinations thereof. In some embodiments, the VSD can control the plurality of synchronous motors 115 using vector control. In some embodiments, the high dynamic closed loop current controller can provide measured current feedback information from the current sensor 110 of the output current to the plurality of synchronous motors 115 back to the single motor drive 105.

In some embodiments, the single motor drive 105 can include a variable frequency drive (VFD). The VFD can use Voltz per Hertz (scalar) control to control to the plurality of synchronous motors connected to the VFD. In some embodiments, the variable frequency drive can control the plurality of synchronous motors 115 using scalar control with stabilization loops.

In some embodiments, the system 100 can include the current sensor 110. In some embodiments, the current sensor 110 can be disposed at the output of the single motor drive 105. In some embodiments, the current sensor 110 can be located on a DC bus of the single motor drive 105. In some embodiments, the current sensor 110 can measure a DC link current to determine the output current, the output current reconstructed from an emitter current of the switches. In some embodiments, the current sensor 110 can be located on a three phase AC output of the motor drive 105. In some embodiments, the current sensor 110 can include a first current sensor 110 and a second current sensor 110, the first current sensor 110 located on a first phase of the AC current output and the second current sensor 110 located on a second phase of the AC current output to detect the output current. In some embodiments, the current sensor 110 can detect the output current on the three phase AC output and relay the measured current back to the single motor drive 105. In some embodiments, the current signal from the first current sensor 110 and the second current sensor 110 can be sent to a third device. The third device can receive the current from the first current sensor 110 and the second current sensor 110 and determine the current of the first phase, the second phase, the third phase, and combinations thereof. In some embodiments, the current sensor 110 can include a current sensor 110 located at each phase of the three-phase AC output. In some embodiments, the single motor drive 105 can include the current sensor 110 at or near the output to measure the output signal of the single motor drive 105 and feedback the output signal to the single motor drive 105.

In some embodiments, the system 100 can include the plurality of synchronous motors 115. In some embodiments, the plurality of synchronous motors 115 can be connected to the single motor drive 105 at the output. In some embodiments, the plurality of synchronous motors 115 can be connected in a parallel configuration to each of the other synchronous motors 115. In some embodiments, each synchronous motor 115 of the plurality of synchronous motors 115 can have a similar size and power rating to operate a substantially similar load on each synchronous motor 115. In some embodiments, each of the plurality of synchronous motors 115 can have a same size and power rating. In some embodiments, each of the plurality of synchronous motors 115 can be the same motor. In other embodiments, each of the plurality of synchronous motors 115 can include the similar size, power rating, operational characteristics, and combinations thereof.

In some embodiments, the plurality of synchronous motors 115 can include pure synchronous reluctance motors. In some embodiments, the plurality of synchronous motors 115 can include permanent magnet assisted synchronous motors. In some embodiments, the plurality of synchronous motors 115 can include interior permanent magnet synchronous motors. The plurality of synchronous motors 115 include an air gap. The air gap being the distance separating the stator from the rotor core. The smaller the air gap, the greater the magnetizing inductance of the motor. Moreover, a motor including a larger air gap can have a smaller magnetizing inductance than the motor with the smaller air gap. In some embodiments, the plurality of synchronous motors 115 can include an air gap within a particular distance to maintain the magnetizing inductance of the synchronous motors 115 at a high enough inductance so the single motor drive 105 can control the net active power and the net reactive power.

In some embodiments, each of the plurality of synchronous motors 115 can be connected to an individual load. Each individual load connected to each of the plurality of synchronous motors 115 can include a similar load requirement. In some embodiments, the load connected to the plurality of synchronous motors 115 can include a similar inertia requirement, a similar speed requirement, a direction of rotation, and a combination thereof.

In some embodiments, the plurality of synchronous motors 115 can be at least two synchronous motors 115. In some embodiments, the plurality of synchronous motors 115 can be at least three synchronous motors 115. In some embodiments, the plurality of synchronous motors 115 can be at least four synchronous motors 115. In some embodiments, the plurality of synchronous motors 115 can be at least six synchronous motors. In some embodiments, the number of synchronous motors 115 connected to the single motor drive 105 in parallel can range from two to sixteen synchronous motors 115. In some embodiments, the number of synchronous motors 115 connected to the single motor drive 105 in parallel can range from four to sixteen synchronous motors 115. In some embodiments, the number of synchronous motors 115 connected to the single motor drive 105 can include up to sixteen synchronous motors 115.

In some embodiments, starting the plurality of synchronous motors 115 of the system 100 can include synchronously starting each of the plurality of synchronous motors 115. In some embodiments, synchronously starting the plurality of synchronous motor 115 can include starting the synchronous motors at the same time. In some embodiments, a stable start of the plurality of synchronous motors 115 can include aligning each rotor in the same direction prior to starting the plurality of synchronous motors 115. In some embodiments, aligning each rotor of the plurality of synchronous motors 115 can include aligning each rotor of the plurality of synchronous motors 115 in the same direction. In some embodiments, aligning the plurality of synchronous motors 115 can include aligning each rotor of the plurality of synchronous motors 115 in a substantially similar rotor position. Alignment can prevent oscillations in the plurality of synchronous motors 115, whereby a misalignment of the rotor at the start of the plurality of synchronous motors 115 can lead to oscillations in the misaligned motor. In some embodiments, oscillations can include circulating current to flow between the misaligned synchronous motor 115 and any of the other of the plurality of synchronous motors 115, thereby potentially leading to damage to the system 100. In some embodiments, the plurality of synchronous motors 115 can be started using any of a plurality of starting methods including, but not limited to, DC injection, manual starting, pulse control, starting the motor while the rotors are rotating, other methods, and combinations thereof.

Figure 2:
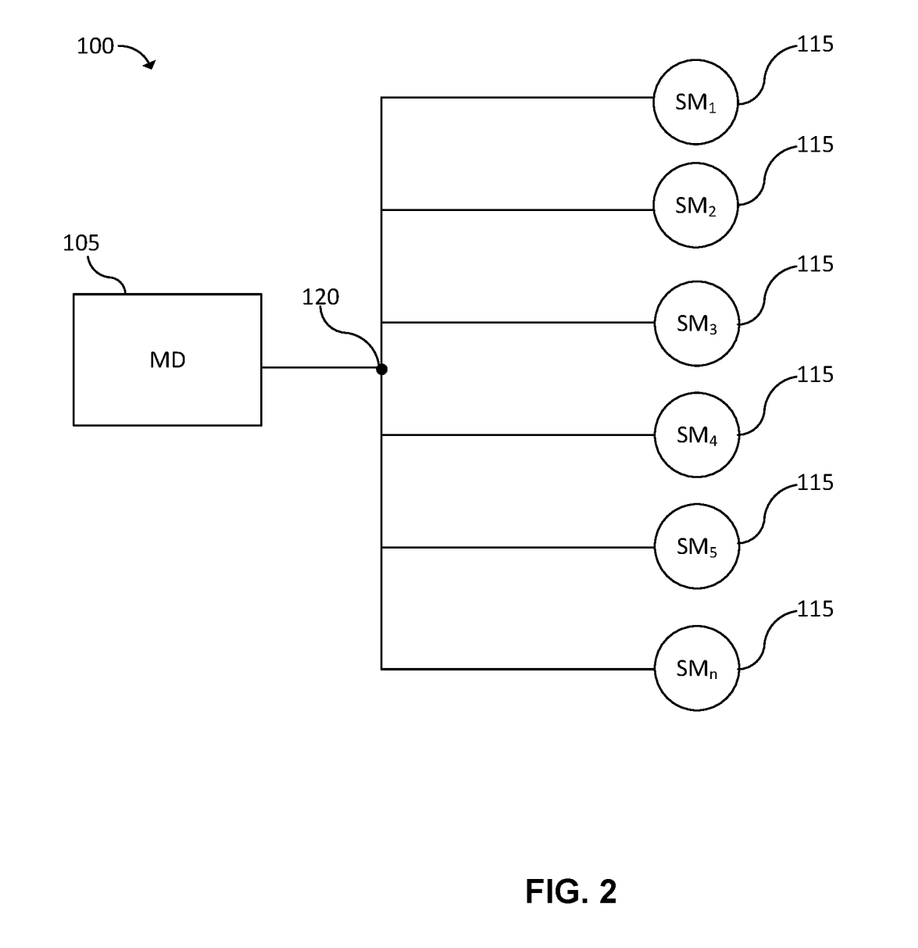
FIG. 2 is a schematic view of the system including a single motor drive connected to the plurality of synchronous motors in parallel, according to some embodiments.

FIG. 2 is a schematic view of the system 100 including the single motor drive 105 connected to the plurality of synchronous motors 115 in parallel, according to some embodiments. In some embodiments, the single motor drive 105 can be connected to each of the plurality of synchronous motors 115 at a common node 120. In some embodiments, the current sensor 110 can be disposed at the output of the single motor drive 105 between the single motor drive 105 and the common node 120 to detect a current from the single motor drive 105 to the plurality of synchronous motors 115. In some embodiments, the current sensor 110 can be disposed between the output of the single motor drive 105 and an input of the plurality of synchronous motors 115.

Figure 3:
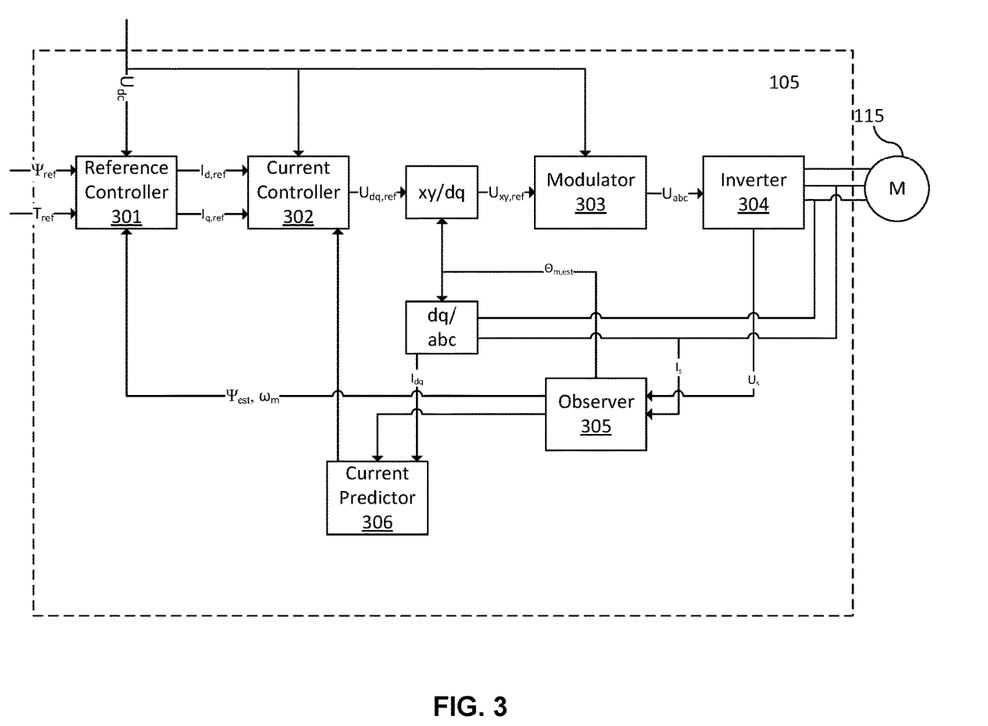
FIG. 3 is a schematic view of the single motor drive of FIG. 1, according to some embodiments.

FIG. 3 is a schematic view of a single motor drive 105 of FIG. 1, according to some embodiments. It is to be understood that the single motor drive 105, and the components of the single motor drive 105, shown in FIG. 3 is an illustrative embodiment and not intended to be limiting. Consequently, the motor drive 105 can include any of a combination of components to receive a current output from the motor drive 105 and control the plurality of synchronous motors 115 based, at least in part, on the input. In some embodiments, the motor drive 105 can include, but not limited to, an observer 305, a current predictor 306, a reference controller 301, a current controller 302, a modulator 303, an inverter 304, other components for a motor drive, and combinations thereof.

In some embodiments, the input to the single motor drive 105 can include a reference flux, a reference torque, a reference speed, other reference signals, and combinations thereof. In some embodiments, the single motor drive 105 can receive the input signals and determine, based on the input signals, the output signals to control the plurality of synchronous motors 115.

In some embodiments, the single motor drive 105 can receive the output current from the current sensor 110 and determine the estimated rotor flux, rotor orientation, estimated angular speed of the synchronous motors 115, estimated rotor positions of the synchronous motors 115 and combinations thereof. In some embodiments, the single motor drive 105 can include the observer 305. In some embodiments, the observer 305 can receive the current sensor data from the current sensor 110 and provide the estimated rotor flux, rotor orientation, estimated angular speed of the plurality of synchronous motors 115, estimated rotor position of the plurality of synchronous motors 115, and a combination thereof.

In some embodiments, the single motor drive 105 can determine the predicted current of a next time interval for the synchronous motors 115. In some embodiments, the single motor drive 105 can include a current predictor 306, the current predictor 306 can receive a current vector for the d and q axis to determine the predicted current for the next time interval.

In some embodiments, the single motor drive 105 can determine the reference current based on reference flux, reference torque, reference speed, estimated angular speed, DC bus voltage, maximum torque per amps (MPTA), maximum torque per voltage, load angle limitation algorithm, and combinations thereof. In some embodiments, the single motor drive 105 can include a reference controller 301, the reference controller 301 can receive a reference flux, reference torque, DC bus voltage, estimated flux, estimated angular speed of the plurality of synchronous motors 115, and combinations thereof, to determine the reference current. In some embodiments, the reference controller 301 determines an optimal reference current based on the reference inputs and current feedback from the current sensor 110. In some embodiments, the optimal reference values determined by the reference controller 301 can further be based on the DC bus voltage, MTPA, maximum torque per voltage, load angle limitation algorithm, optimal reference multi-motor algorithms, and combinations thereof. In some embodiments, the reference current can be used to control the active and reactive power at the common node 120 and reject any power perturbations in any of the synchronous motors 115 due to unbalanced load conditions.

In some embodiments, the single motor drive 105 can determine reference voltage. In some embodiments, the single motor drive 105 can include a current controller 302, the current controller 302 can receive the reference current and can determine the reference voltage to the modulator 303.

In some embodiments, the single motor drive 105 can determine logic control for gate pulses based on reference voltage vectors. In some embodiments, the reference voltage vectors can include the reference voltage vectors, other voltage vectors, and combinations thereof. In some embodiments, the single motor drive 105 can include a modulator 303. In some embodiments, the modulator 303 can receive the reference voltage vector. In some embodiments, the modulator 303 can use pulse width modulation to receive the reference voltage and can provide logic control for gate pulses to the inverter 304. In some embodiments, the modulator 303 can use any of a plurality of signal processing techniques to provide logic control to the gate pulses. In some embodiments, the modulator 303 can use space vector pulse width modulation (SVPWM) to receive the reference voltage vector and can provide a logic control for gate pulses for the gates across the DC bus to convert DC bus voltage to AC voltage to control the plurality of synchronous motors 115.

In some embodiments, the single motor drive 105 can determine logic control for gate pulses to control the output to the plurality of synchronous motors 115. In some embodiments, the single motor drive 105 can include an inverter 304. In some embodiments, the single motor drive 105 can determine the output current to control the plurality of synchronous motors 115 by providing logic control for gate pulses to the inverter 304. In some embodiments, the inverter 304 can receive the gate pulses from the single motor drive 105 and convert the DC bus voltage to AC voltage to drive the plurality of synchronous motors 115. In some embodiments, the inverter 304 can receive the gate drive signals from the modulator 303 to convert the DC bus voltage to the three phase AC output to control the plurality of synchronous motors 115. In some embodiments, the AC output can include more than three phases.

Figure 4:
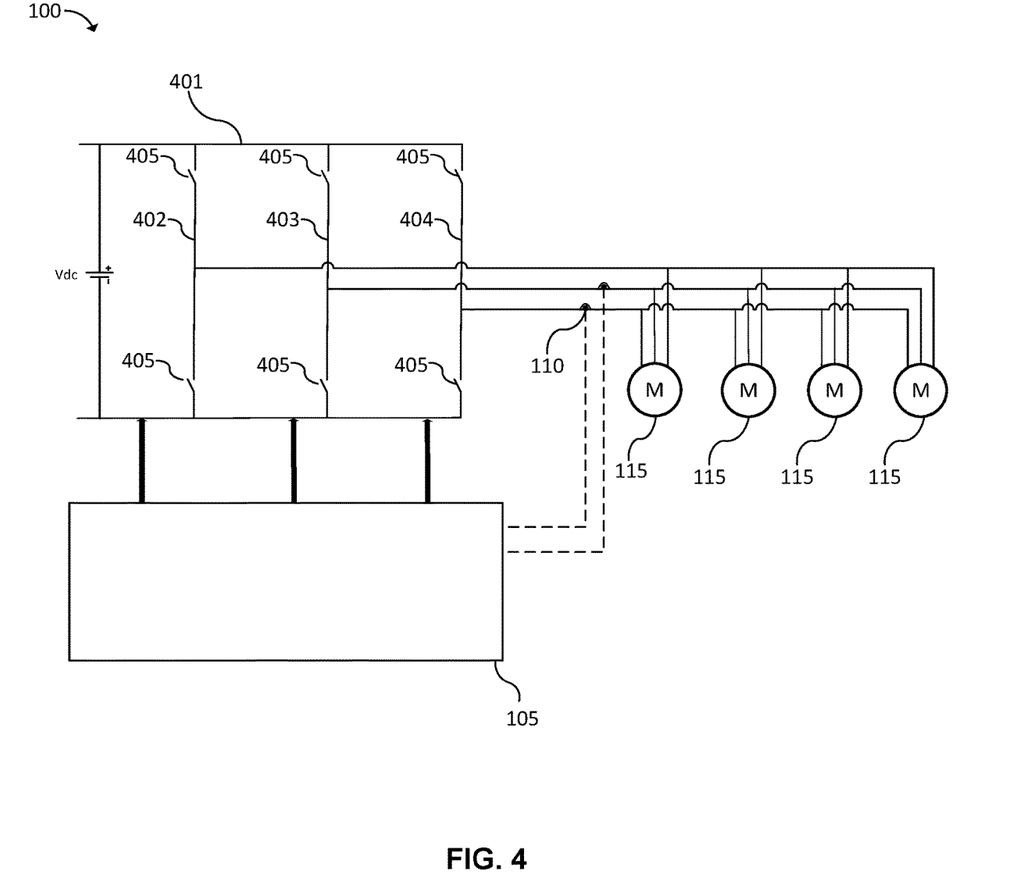
FIG. 4 is a schematic view of the inverter of the single motor drive of FIG. 1, according to some embodiments.

FIG. 4 shows a schematic view of the inverter 304 of the single motor drive 105 of FIG. 1, according to some embodiments. It is noted that FIG. 4 is only an illustrative embodiment of the inverter 304 and is not intended to be limiting. In some embodiments, the inverter 304 converts DC voltage to a three phase AC output. In some embodiments, the inverter 304 can include any of a plurality of components capable of converting DC voltage to AC voltage including, but not limited to, switches, diodes, capacitors, inverters, other components, and combinations thereof. In some embodiments, the inverter 304 can include a DC bus 401, the DC bus 401 including the DC bus voltage across the DC bus 401. In some embodiments, the inverter 304 can include a first leg 402, a second leg 403, and a third leg 404 connected across the DC bus. In some embodiments, each of the first leg 402, the second leg 403, and the third leg 404 can be connected to a phase of the three phase AC output of the single motor drive 105. In some embodiments, the DC bus can include a rectified bridge connected to the three-phase AC output. In some embodiments, the rectifier bridge can further regenerate energy back to the main supply. In some embodiments, the inverter 304 can include a pulse converter, including a six-pulse converter, a twelve-pulse converter, other pulse converters, and combinations thereof.

In some embodiments, the single motor drive 105 can include a plurality of switches 405 to convert the DC voltage to AC voltage. In some embodiments, each of the first leg 402, the second leg 403, the third leg 404 can include a switch 405. In some embodiments, each of the first leg 402, the second leg 403, the third leg 404 can include a pair of switches 405 connected in series across each leg. In some embodiments, each of the first leg 402, the second leg 403, the third leg 404 can include a plurality of switches in a plurality of configurations including, but not limited to, series, anti-series, parallel, other configurations, and a combination thereof. In some embodiments, the single motor drive 105 can control each switch 405 using logic gate drive signals to convert the DC bus voltage to AC voltage. In some embodiments, the switch 405 can include any of a plurality of solid-state switching devices including, but not limited to, bipolar transistors (BJTs), field-effect transistors (FETs) type devices, insulated-gate bipolar transistors (IGBTs), metal-oxide-semiconductor field-effect transistor (MOSFET) type devices, other solid-state switches, and combinations thereof.

Figure 5:
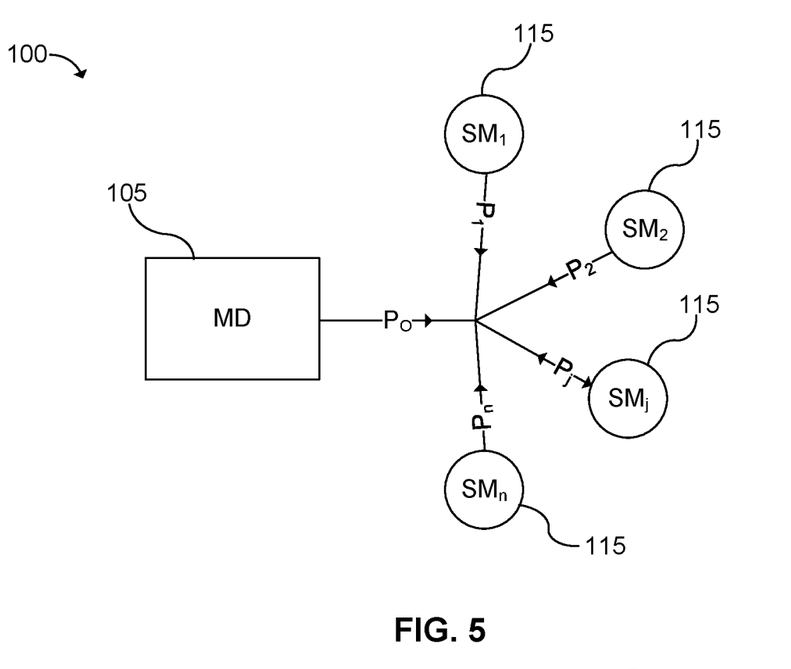
FIG. 5 is a schematic view of the single motor drive connected to the plurality of synchronous motors, according to some embodiments.

FIG. 5 is a schematic view of a single motor drive 105 connected to the plurality of synchronous motors 115, according to some embodiments. The single motor drive 105 can control the plurality of synchronous motors 115 by maintaining a net active power balance in equilibrium where the output of the single motor drive 105 is equivalent to the total load of the plurality of synchronous motors 115. In some embodiments, the single motor drive 105 can maintain synchronous operation of the plurality of synchronous motors 115 by maintaining the net active power balance at the common node 120 at zero. In some embodiments, the single motor drive 105 can maintain synchronous operation of the plurality of synchronous motors 115 connected to the single motor drive 105 by maintaining the net active power balance at the common node 120 at near zero. In some embodiments, maintaining the net active power balance at the common node 120 can include maintaining the output from the single motor drive 105 equal to the power delivered to all the loads connected to the plurality of synchronous motors 115 including losses. In some embodiments, the single motor drive 105 can maintain the net active power balance by maintaining the frequency at the common node 120 constant. Therefore, in some embodiments, the net active power balance by the single motor drive 105 can be represented by:

$$\Sigma_{j=0}^{N} P_j = 0 \rightarrow f_G = \text{constant}$$

Figure 6:
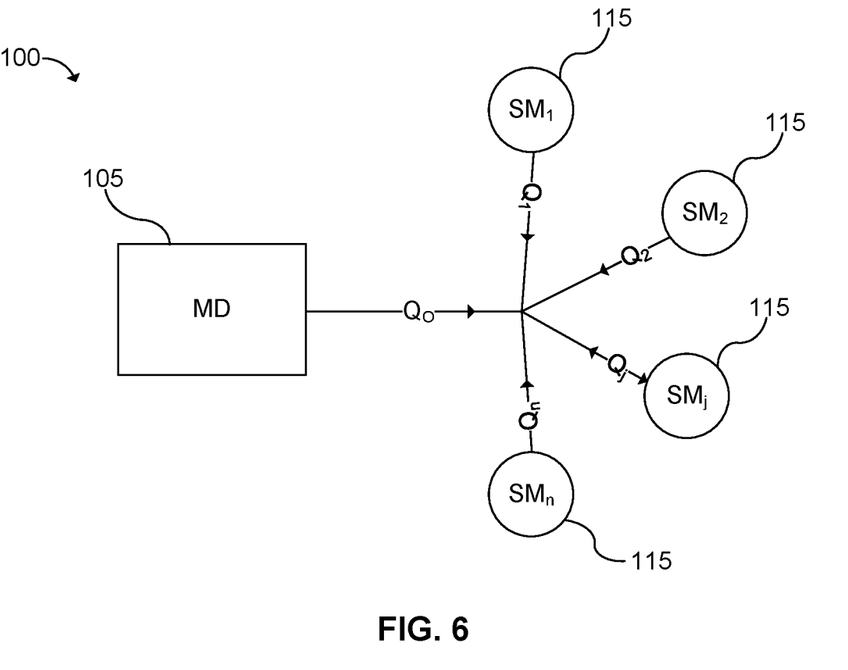
FIG. 6 is a schematic view of the single motor drive connected to the plurality of synchronous motors, according to some embodiments.

FIG. 6 is a schematic view of a single motor drive 105 connected to the plurality of synchronous motors 115 in parallel, according to some embodiments. The single motor drive 105 can control the plurality of synchronous motors 115 by maintaining a reactive power balance in equilibrium by maintaining the output by the single motor drive 105 equivalent to the reactive power exchanged with the loads. In some embodiments, the single motor drive 105 can maintain voltage stability of the plurality of synchronous motors 115 connected to the single motor drive 105 by maintaining the net reactive power balance at the common node 120 at zero. In some embodiments, the single motor drive 105 can maintain voltage stability at the common node 120 by maintaining the reactive power output by the single motor drive 105 equal to the reactive power exchanged with the loads. Therefore, the net reactive power balance by the single motor drive 105 at the common node 120 can be represented by:

$$\Sigma_{j=0}^{N} Q_j = 0 \rightarrow V_G = \text{constant}$$

Figure 7:
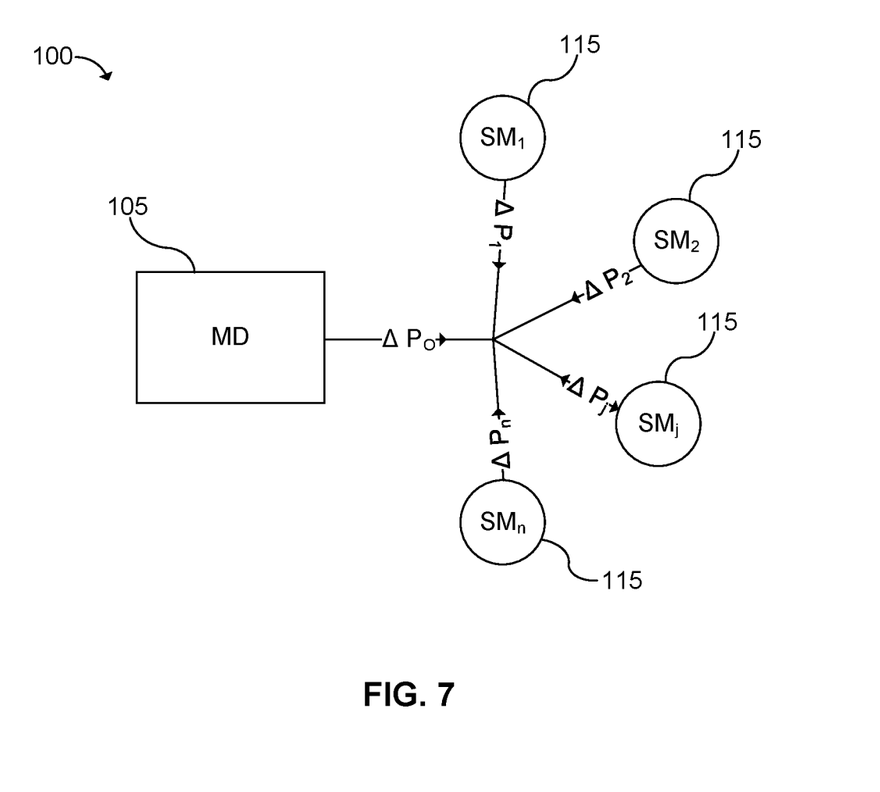
FIG. 7 is a schematic view of the single motor drive connected to the plurality of synchronous motors, according to some embodiments.

FIG. 7 is a schematic view of a single motor drive 105 connected to the plurality of synchronous motors 115 in parallel, according to some embodiments. In some embodiments, the single motor drive 105 can maintain a rotor angle stability of the plurality of synchronous motors 115 connected to the single motor drive 105 by rejecting a power perturbation from any of the plurality of synchronous motors 115. In some embodiments, the rejection of the power perturbation can include the ability of the plurality of synchronous motors 115 of the system 100 to remain in synchronous operation after a disturbance. In some embodiments, a disturbance can include a local and substantial disturbance, wherein the power perturbation to the synchronous machines 115 can cause one of the plurality of synchronous motors 115 to fall out of step due to an acceleration during the perturbation. In some embodiments, the time scale for a local and substantial disturbance can range from less than a second to a couple of seconds. In some embodiments, a local and substantial disturbance can include a transient instability in the form of an aperiodic angular separation due to lack of synchronizing torque Ks*Δδ. In some embodiments, a disturbance can include a small disturbance, wherein the disturbance causes a small increase or variation in load. In some embodiments, small disturbance rotor angle stability can be associated with insufficient damping torque Kd*Δf. In some embodiments, a power perturbation rejection at the common node 120 can be represented by:

$$\Sigma_{j=0}^{N} \Delta P_j = \Delta P_0 + \Sigma_{j=1}^{N} K_{sj} \times \Delta \delta_j + K_{dj} \times \Delta f_j = 0$$

In some embodiments, the power perturbation can include an aperiodic angular separation due to lack of synchronizing torque, a rotor angle instability due to insufficient damping torque, and a combination thereof.

Figure 8:
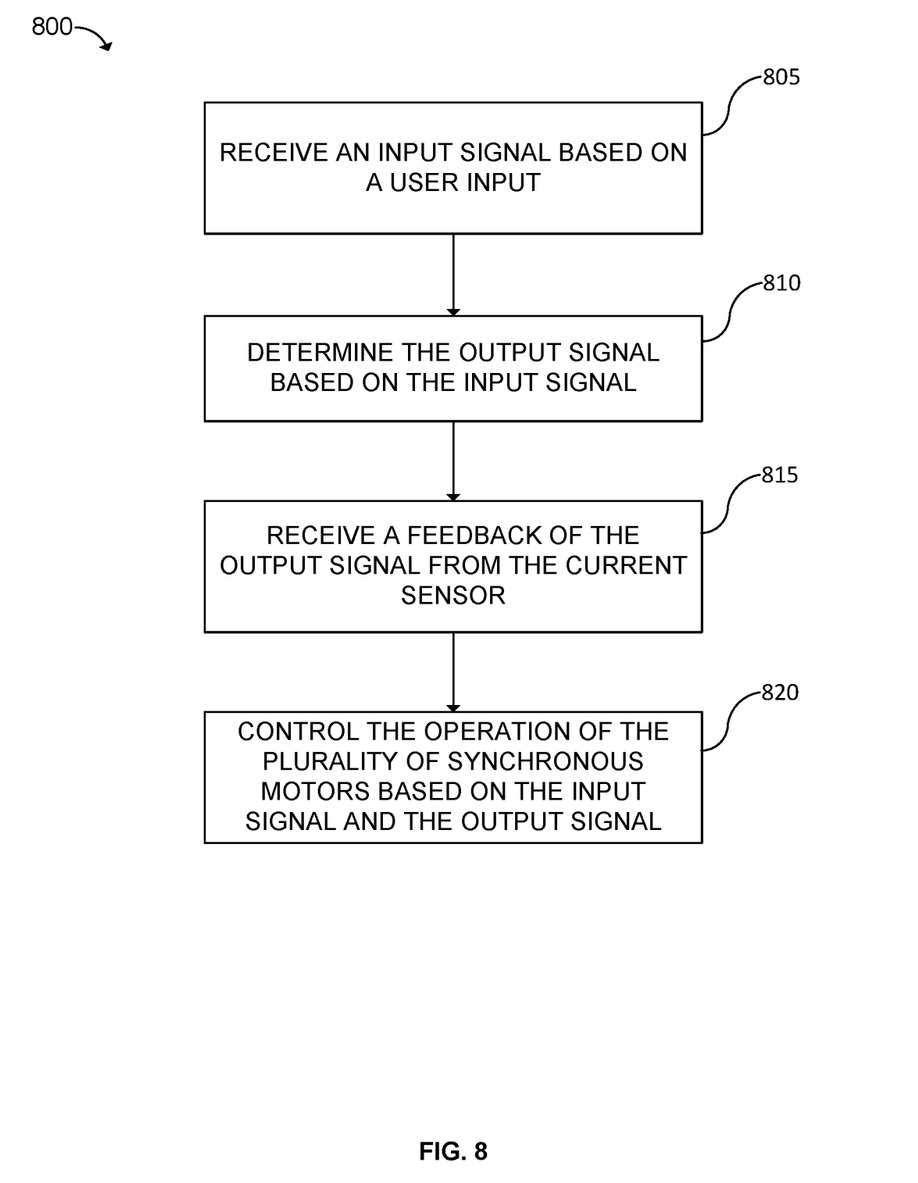
FIG. 8 is a flow chart of a method, according to some embodiments.

FIG. 8 is a flow chart of a method 800, according to some embodiments. The method 800 generally relates to operating the plurality of synchronous motors 115 by the single motor drive 105. In some embodiments, the method of operating the system 100, the system 100 including a single motor drive 105, a plurality of synchronous motors 115 connected in parallel to the single motor drive 105, and a current sensor 110 to detect an output signal of the single motor drive.

At 805, the method 800 can include receiving, by the single motor drive 105, an input signal based on a user input. In some embodiments, the input signal can include the reference flux, the reference torque, the reference speed, other reference signals, and combinations thereof. In some embodiments, the input signal can be provided by the user to, at least in part, control the plurality of synchronous motors 115. In some embodiments, control of the plurality of synchronous motors 115 can include controlling the speed and power of the plurality of synchronous motors 115.

At 810, the method 800 can include determining, by the single motor drive 105, the output signal based on the input signal. In some embodiments, the output signal of the single motor drive 105 can drive the plurality of synchronous motors 115. In some embodiments, the output signal can include a voltage and current. In some embodiments, the output signal can include the DC bus voltage and current. In some embodiments, the output signal can include an output voltage and current reconstructed from the emitter current of the switches. In some embodiments, the output signal can include the three-phase AC voltage and current on the three phase AC output. In some embodiments, the single motor drive 105 can receive the input signal and the single motor drive 105 can determine the output current based on the input signal.

At 815, the method 800 can include receiving, by the single motor drive 105, a feedback of the output signal from the current sensor 110. In some embodiments, the current sensor 110 can be located at the three-phase AC output. In some embodiments, the current sensor 110 can be located on the DC bus. In some embodiments, the single motor drive 105 can include the current sensor 110. In some embodiments, the current sensor 110 can be external to the single motor drive 105 to provide feedback signals to the single motor drive 105.

At 820, the method 800 can include controlling, by the single motor drive 105, the operation of the plurality of synchronous motors 115 based on the input signal and the output signal. In some embodiments, the single motor drive 105 compares the measured output signal to the input signal. In some embodiments, based on the measured output signal and the input signal, the single motor drive 105 can control the current signal to control the plurality of synchronous motors 115. In some embodiments, controlling the plurality of synchronous motors 115 can include providing a voltage and current to the plurality of synchronous motors 115 to maintain the net active power and the net reactive power at the common node at, or near, equilibrium. In some embodiments, controlling the operation of plurality of synchronous motors 115 can include rejecting power perturbations at the plurality of synchronous motors 115 by controlling the output signal of the single motor drive 105 to the plurality of synchronous motors 115.

In some embodiments, the single motor drive 105 can include a VFD. In some embodiments, the VFD can control the operation of the plurality of synchronous motors 115 by controlling the plurality of synchronous motors 115 using scalar Voltz per Hertz control. In some embodiments, the VFD can further include stabilization loops.

In some embodiments, the single motor drive 105 can include a VSD. In some embodiments, the VSD can include a high dynamic closed loop current controller. In some embodiments, the VSD can control the operation of the plurality of synchronous motors 115 by using vector control. In some embodiments, vector control can include direct torque control. In some embodiments, vector control can include field-oriented control. In some embodiments, vector control can include model predictive control. In some embodiments, the single motor drive 105 can include any of a plurality of vector control platforms to control the plurality of synchronous motors 115.

In some embodiments, controlling, by the single motor drive 105, the plurality of synchronous motors 115 by the output signal can further include maintaining, by the single motor drive 105, a net active power and a net reactive power at the common node in equilibrium by controlling the output current based on the input signal. In some embodiments, controlling, by the single motor drive 105, the plurality of synchronous motors 115 by the output signal can further include determining, by the single motor drive 105, a power perturbation by the plurality of synchronous motors based on the feedback from the current sensor. In some embodiments, controlling, by the single motor drive 105, the plurality of synchronous motors 115 by the output signal can further include rejecting, by the single motor drive 105, the power perturbation in the plurality of synchronous motors by controlling the output signal based on the input signal. In some embodiments, the power perturbation can include an aperiodic angular separation and/or a rotor angle instability. For example, the aperiodic angular separation can be due to lack of synchronizing torque, and the rotor angle stability can be due to insufficient damping torque.

Figure 9:
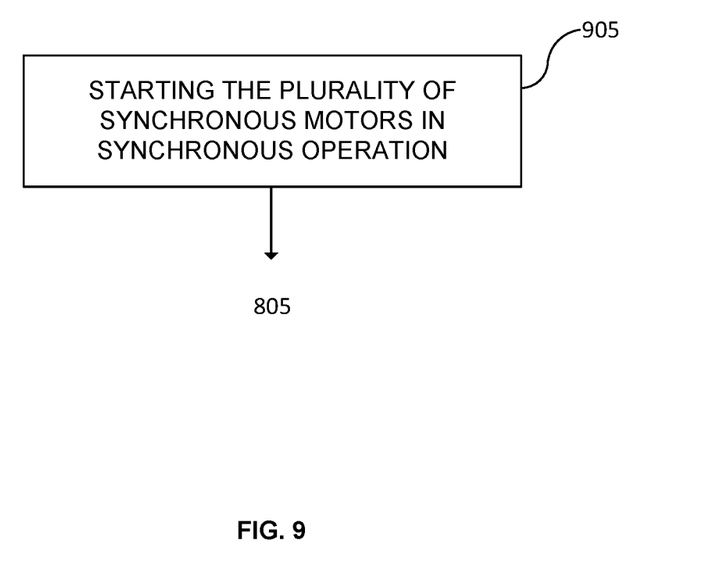
FIG. 9 is a flow chart of a method, according to some embodiments.

FIG. 9 is a flow chart of a method 800, according to some embodiments. In some embodiments, at 905, the method 800 can further include starting, by the single motor drive 105, the plurality of synchronous motors 115 in synchronous operation. In some embodiments, synchronous operation comprises each of the plurality of synchronous motors being in alignment. In some embodiments, synchronous operation can further include each of the plurality of synchronous motors being connected to a similar load.

What is claimed is:

1. A system comprising:
a single motor drive comprising,
an input comprising an input signal based on a user input,
an output comprising an output signal determined by the single motor drive, and
a sensor comprising:
a current sensor external to the single motor drive, wherein only one sensor detects the output signal; and
a plurality of synchronous motors,
wherein the plurality of synchronous motors comprises being connected in parallel to the single motor drive, the plurality of synchronous motors having a similar load connected to each of the plurality of synchronous motors;
wherein the single motor drive receives the output signal from the sensor and controls the plurality of synchronous motors based on the input signal and an output current; and
wherein the sensor detects a power perturbation from the plurality of synchronous motors in the output signal and the single motor drive rejects the power perturbation to maintain the plurality of synchronous motors in synchronous operation.

2. The system of claim 1, wherein the input signal comprises a reference speed, a reference torque, a reference flux, and a combination thereof.

3. The system of claim 1, wherein the output signal is on a three-phase AC line;
wherein the sensor further comprises:
a second current sensor,
wherein the current sensor is a first current sensor; and
wherein the first current sensor is disposed on a first phase of the three-phase AC line and detects a first phase signal, and the second current sensor is disposed on a second phase of the three-phase AC line and detects a second phase signal,
wherein the single motor drive obtains the first phase signal and second phase signal from the respective first current sensor and second current sensor and determines the output current at each phase of the three-phase AC line.

4. The system of claim 1, wherein the single motor drive further comprises:
an inverter,
wherein the inverter comprises a DC bus, and wherein the inverter converts a DC voltage on the DC bus to a three-phase AC output;
wherein the sensor further comprises being disposed on the DC bus.

5. The system of claim 1,
wherein the single motor drive rejects the power perturbation in all of the plurality of synchronous motors due to unbalanced load conditions by controlling the output current and based on the input signal.

6. The system of claim 5, wherein the power perturbation comprises an aperiodic angular separation due to lack of synchronizing torque, a rotor angle instability due to insufficient damping torque, and combinations thereof.

7. The system of claim 1, wherein the single motor drive comprises a variable speed drive having a closed loop current controller, and,
wherein the variable speed drive controls the plurality of synchronous motors with vector control.

8. The system of claim 1, wherein the single motor drive comprises a variable frequency drive,
wherein the variable frequency drive controls the plurality of synchronous motors with scalar Volts per Hertz control with stabilization loops.

9. The system of claim 1, wherein the plurality of synchronous motors comprises from two to sixteen synchronous motors.

10. The system of claim 1, wherein the plurality of synchronous motors comprises permanent magnet assisted synchronous motors.

11. The system of claim 1, wherein the plurality of synchronous motors comprises pure synchronous reluctance motors.

12. The system of claim 1, wherein the plurality of synchronous motors comprises interior permanent magnet synchronous motors.

13. A method of operating a system, the system comprising a single motor drive, a plurality of synchronous motors connected in parallel to the single motor drive, and a sensor to detect an output signal of the single motor drive, the method comprising:
receiving, by the single motor drive, an input signal based on a user input,
determining, by the single motor drive, the output signal based on the input signal;
receiving, by the single motor drive, a feedback of the output signal from the sensor,
wherein only one sensor detects the output signal;
determining, by the single motor drive, a power perturbation by the plurality of synchronous motors based on the feedback from the sensor; and
controlling, by the single motor drive, an operation of the plurality of synchronous motors based on the input signal and an output current;
wherein the sensor detects the power perturbation from the plurality of synchronous motors in the output signal and the single motor drive rejects the power perturbation to maintain the plurality of synchronous motors in synchronous operation.

14. The method of claim 13, wherein controlling, by the single motor drive, the operation of the plurality of synchronous motors based on the input signal and the output current further comprises:
maintaining, by the single motor drive, a net active power and a net reactive power in equilibrium by controlling the output current based on the input signal.

15. The method of claim 14, wherein the power perturbation comprises an aperiodic angular separation due to lack of synchronizing torque, a rotor angle instability due to insufficient damping torque, and a combination thereof.

16. The method of claim 13, further comprising:

starting, by the single motor drive, the plurality of synchronous motors in synchronous operation;

wherein synchronous operation comprises each of the plurality of synchronous motors being in alignment and each of the plurality of synchronous motors being connected to a similar load.

17. The method of claim 13, wherein the single motor drive comprises a variable frequency drive, and wherein controlling, by the single motor drive, the operation of the plurality of synchronous motors based on the input signal and the output signal further comprises:

controlling, by the variable frequency drive, the plurality of synchronous motors with scalar Volts per Hertz control with stabilization loops.

18. The method of claim 13, wherein the single motor drive comprises a variable speed drive including a high dynamic closed loop current controller, and wherein controlling, by the single motor drive, the operation of the plurality of synchronous motors based on the input signal and the output signal further comprises:

controlling, by the variable speed drive, the plurality of synchronous motors with vector control.

19. An apparatus for controlling multiple synchronous motors, comprising:

a single motor drive comprising:

an input, wherein the input comprises an input signal based on a user input, an output, wherein the output comprises an output signal, and an inverter, wherein the inverter converts a DC voltage to a three-phase AC output;

at least two current sensors external to the single motor drive for detecting current on an associated two phases of the three-phase AC output at a common node, the common node comprising a node for each respective phase of the three-phase AC output, wherein only the at least two current sensors detect the output signal on the associated two phases of the three-phase AC output and provides a feedback to the single motor drive; and a plurality of synchronous motors, wherein the plurality of synchronous motors comprises being connected to the single motor drive in a parallel configuration;

wherein the single motor drive controls an operation of the plurality of synchronous motors by controlling the output signal based on the input signal and an output current; and wherein the at least two current sensors detect a power perturbation from the plurality of synchronous motors in the output signal and the single motor drive rejects the power perturbation to maintain the plurality of synchronous motors in synchronous operation.

20. The apparatus of claim 19, wherein the power perturbation comprises an aperiodic angular separation due to lack of synchronizing torque, a rotor angle instability due to insufficient damping torque, and a combination thereof.

* * * * *